United States Patent
Mazuir et al.

[15] 3,686,744
[45] Aug. 29, 1972

[54] METHOD OF MANUFACTURING A FLEXIBLE TUBULAR MEMBER BY COILING A SHAPED METALLIC STRIP ABOUT A TUBE OF SNYTHETIC PLASTIC MATERIAL

[72] Inventors: Rene A. Mazuir, rue Charles Voisin; Daniel Hoffmann, 34, boulevard de Brou, both of Bourg-en-Bresse, France

[22] Filed: July 6, 1970

[30] Foreign Application Priority Data

July 10, 1969 France....................6923533

[21] Appl. No.: 52,296

[52] U.S. Cl.....................29/456, 29/234, 93/59 MT, 93 59 PL/, 93/94 M
[51] Int. Cl.......B23q 3/154, B23q 3/18, B31c 13/00
[58] Field of Search..29/234, 456; 93/59 PL, 59 MT, 93/77 LL, 80, 94 M

[56] References Cited

UNITED STATES PATENTS 3,580,461   5/1971   Dobell......................93/94 M

*Primary Examiner*—Wayne A. Morse, Jr.
*Attorney*—Holcombe, Wetherill & Brisebois

[57] ABSTRACT

Method of manufacturing a flexible tubular member by coiling a shaped metallic strip about a tube of synthetic plastic material in which the tube of synthetic material is flattened and curved into an arcuate cross-section before entering the forming head which forms the metallic strip into a tube. The invention includes apparatus for carrying out this process.

9 Claims, 4 Drawing Figures

3,686,744

METHOD OF MANUFACTURING A FLEXIBLE TUBULAR MEMBER BY COILING A SHAPED METALLIC STRIP ABOUT A TUBE OF SNYTHETIC PLASTIC MATERIAL

SUMMARY OF THE INVENTION

This invention relates to a new process of manufacturing a flexible tubular member by helically winding a shaped metallic strip about a flexible tube made of a synthetic material.

The present invention also relates to the articles produced by this process and to a machine for carrying out the process.

The invention relates more particularly to the manufacture of flexible tubes used in the drilling of oil wells. The tubes used for this purpose are equipped at their lower ends with a drilling bit and are progressively introduced into the bore which they make in the ground.

These flexible drilling pipes generally comprise an inner lining consisting of a tube of synthetic material which is encircled by a flexible tubular member made by helically winding a shaped metallic strip. This helical member is itself encircled by several layers of wires or strong shaped metallic strips, which are applied to its periphery in accordance with a technique analogous to the one employed in the manufacture of cables.

It is the principal object of the present invention to solve one particular problem which is posed by the passage of the tube of synthetic material through the forming head which forms the shaped metallic strip into a helix so that it may constitute the tubular flexible member.

This problem results from the fact that the tube of synthetic material must have an outer diameter equal to, and sometimes even slightly greater than, the inner diameter of the flexible tubular member which is to manufactured around it. In order to helically deform the metallic strip, it is essential, because of the elasticity of the strip, to deform it by passing it through a point which is located substantially inside the circle which defines the section of the tubular member which is being made.

It accordingly follows that the strip which is being deformed into a helix resists the normal passage of the synthetic tube which must be positioned inside the tubular member.

The present invention relates to a process which offer a solution to this problem.

It is an object of the present invention to provide a process for manufacturing a flexible tubular member from a shaped metallic strip coiled about a synthetic tube, characterized by the fact that the tube of synthetic material is brought into alignment with the flexible tubular member being formed, the synthetic tube is then substantially flattened and passed through at least one ring, which is preferably rotated, and has a diameter less than the internal diameter of the tubular member being formed, whereas the flattened tube of synthetic material assumes within said ring a generally arcuate form. The tube formed in this manner passed inside the forming head which helically coils the strip from which the tubular member is being formed, and the tube of synthetic material is then returned to its original cylindrical form inside the tubular member which has just been completed by an ovoid member inside the tube of synthetic material. This ovoid member has an external diameter approximating the internal diameter of the tube of flexible material and is kept in place by suitable means, such as the pressure created by fluid inside part of the tube, or magnetic means acting on the ovoid member from outside the tubular member.

In accordance with a preferred embodiment of the invention, the rings through which the tube of synthetic material passes before it enters the forming head are rotatably driven at the same speed as the tube of synthetic material and the tubular member being formed.

In said preferred embodiment of the invention, the ring near the forming head is substantially tangent to a generatrix delimiting the inside of the tubular member being formed so as to separate the opposite side of the tube of synthetic material from the deforming member which imposes the helical deformation on the shaped strip.

In one particular form of this preferred embodiment several successive openings having increasing diameters are used.

In a first method of carrying out the invention an ovoid member is used, which is positioned downstream of the forming head, and is kept in this position by means of a gas under pressure in the downstream part of the tubular member. In another method the position of the ovoid member is maintained by magnetic means acting through the wall of the tube being formed. In this embodiment the tube of synthetic material is advanced while flattened by a partial vacuum maintained upstream of the tube.

In a second method of carrying out the process according to the invention second ovoid member is placed inside the tube upstream of the ring or rings.

In this case, the two ovoid members are connected by a duct which terminates at the ends of the ovoid members, thus creating a continuous communication between the upstrem and downstream sections of the tube of synthetic material. The duct which connects the two ovoid members comprises a Venturi so that when fluid is circulated through this duct it causes a pressure drop between the ovoid members which flattens the tube during its passage through the ring or rings. The circulation of fluid in the tube which connects the two ovoid members may be easily produced by creating, for example a pressure downstream of the ovoid members which is greater than the pressure upstream of these ovoid members. It follows that the passage of the tube of synthetic material through the forming head is thus readily facilitated, while the tube is returned to a cylindrical state by internal pressure in the tube downstream of the ovoid members.

According to a method of carrying out the invention, two ovoid members are used, which are placed upstream and downstream of the ring or rings preceding the forming head. In this third embodiment of the invention the ovoid member upstream of the forming head is held in position by magnetic means outside the tube of synthetic material and the two ovoid members are connected to each other by a rod or cable. The ovoid member which is situated downstream is pierced by an orifice which insures that there is equal pressure upstream and downstream of this second ovoid. The tube of synthetic material is subjected to internal pressure upstream of the ovoid members, whereas downstream it is only subjected to atmospheric pressure, just as in the part between the two ovoid members. In this case, it is the simple passage of the tube through the ring or rings which results in its compression to an arcuate form to permit its passage through the forming head, whereas the ovoid which is located downstream returns the tube of synthetic material to its original cylindrical shape.

It is a further object of the present invention to provide, as a new article of manufacture, a device for carrying out the above-described process. This apparatus is characterized by the fact that it comprises in combination: means for advancing a tube of synthetic material along the axis of a cylindrical member being formed by helically winding a shaped metallic strip, at least one ring preferably rotated, and having an inner diameter less than the inner diameter of the tubular member being manufactured, and an ovoid member having an outer diameter substantially equal to the inner diameter of the tube of synthetic material, mounted downstream of the forming head which forms the flexible tubular member, said ovoid member being kept in position by fluid pressure, or by magnetic means.

In yet another embodiment, the apparatus comprises a second ovoid member positioned upstream of the ring, the two ovoid members being connected by a duct which opens on opposite sides of the two ovoids and which comprises a Venturi between the two ovoids which makes it possible to create a partial vacuum by passing a fluid through said duct.

In another embodiment, the device also comprises two ovoids mounted upstream and downstream of the ring or rings and of the forming head, the two ovoid members being connected to each other by a rod or cable, the upstream ovoid being in substantially fluid-tight contact with the upstream wall of the tube and being kept in place by a magnetic device, whereas the downstream ovoid is pierced by an opening which permits the same pressure, for example atmospheric pressure, to be maintained on both sides of said downstream ovoid.

It is a further object of the present invention to provide flexible tubular members made by helically winding a shaped metallic strip and comprising an inner sheath consisting of a tube of synthetic material, manufactured by the foregoing process, utilizing the apparatus which has just been described.

In order that the invention may be clearly understood, several embodiments thereof will now be described, purely by way of illustration and example, with reference to the accompanying drawing, on which:

Figure 1:
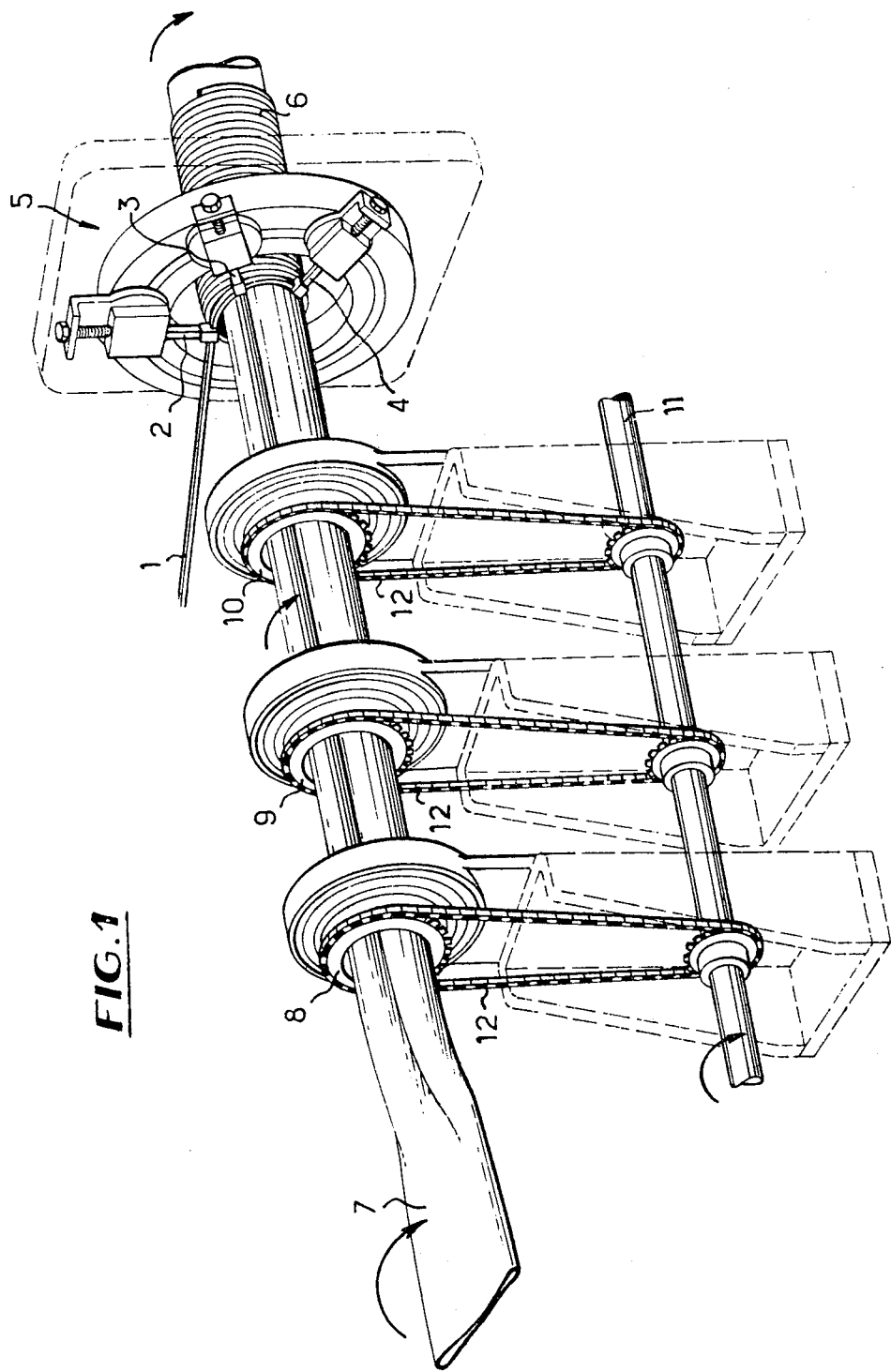
FIG. 1 is a schematic perspective view showing apparatus for carrying out the process according to the invention.

FIG. 1 shows how the shaped metallic strip 1, which is advanced in the direction of the arrow, is helically shaped by the forming fingers 2, 3 and 4, which are attached to a forming head 5, which is schematically shown. The strip 1 is thus transformed into a cylindrical member 6.

Figure 2:
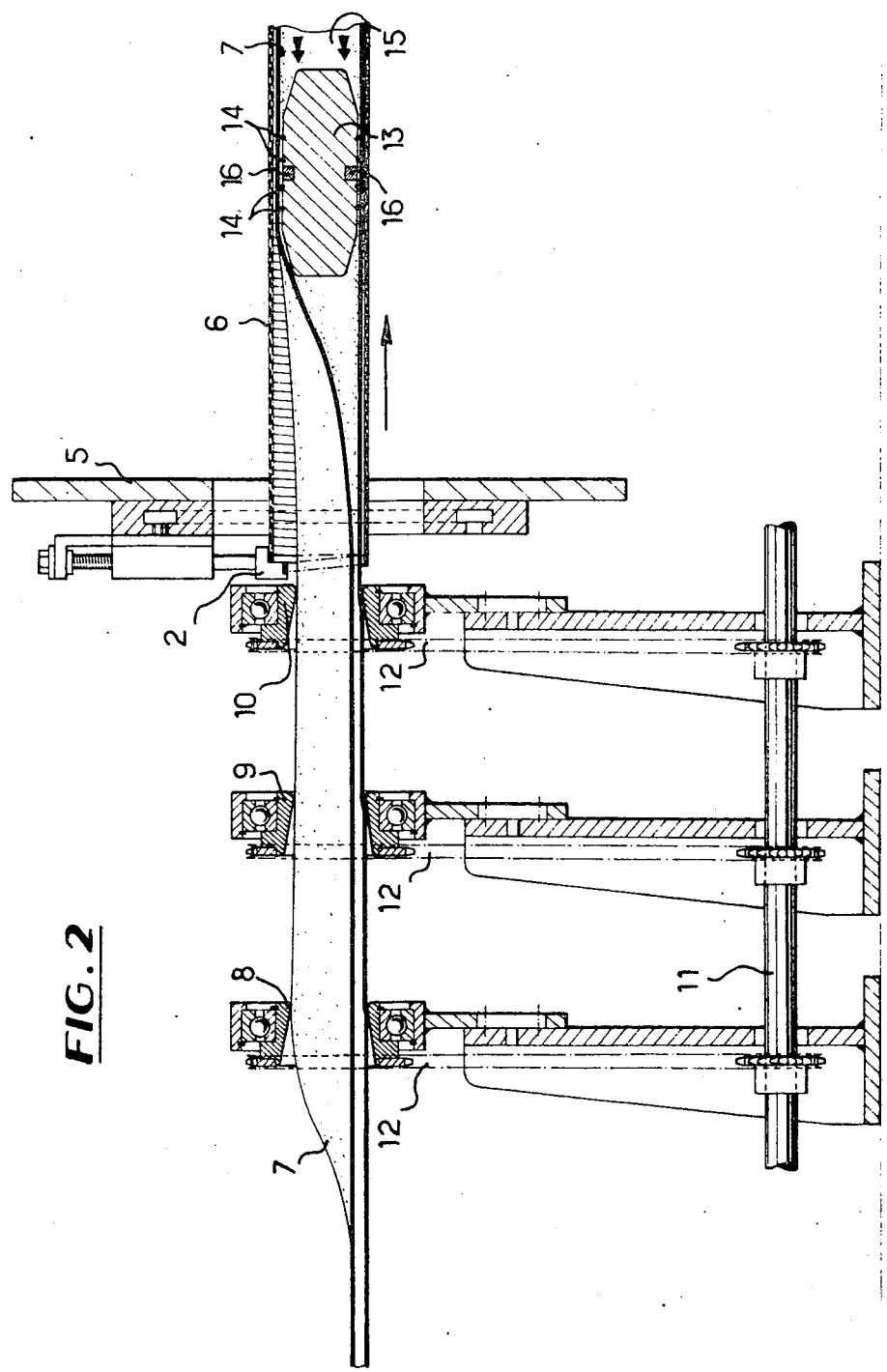
FIG. 2 is a schematic axial sectional view of the device of FIG. 1.

As shown clearly in FIG. 2, the end of the forming finger 2 extends substantially inside the circular section of the tubular member 6. It follows that the presence of this forming finger, which is indispensable to the helical winding of the strip 1, impedes the passage of the tube 7 of synthetic material when this is not deformed and has an external diameter equal or even slightly greater than the internal diameter of the tubular member 6.

In accordance with the invention, the tube 7 is passed, before it travels through the forming head 5, through the rings 8, 9 and 10, which have a diameter less than that of the tubular member 6, the section of the last ring 10 being less than that of the open space in the tubular body being formed by the forming fingers 2, 3 and 4.

The rings 8, 9 and 10 are mounted to rotate and are driven by a shaft 11 through the chains 12, which are schematically shown, at a speed of rotation which corresponds to the speed of rotation of the tubular member 6 being formed.

The tube 7 of synthetic material is itself rotated at the same speed by feeding means, not shown.

As may be seen in particular on FIG. 2, the rings 8, 9 and 10 have diameters which decrease successively. The ring 10 lies opposite the open end of the tubular member 6 at the level of the forming head, the lower edge of the tube 7 being substantially at the level of the lower edge of the tubular member 6. While passing through the rings 8, 9 and 10, the tube of synthetic material 7, which is initially flattened, at the left hand side of FIGS. 1 and 2, is curved into an arcuate section as it passes through these rings.

The tube 7 is returned to its cylindrical shape downstream of the forming head 5 by means of an ovoid member 13, the diameter of which is substantially equal to the inner diameter of the tube 7. This ovoid member may carry sealing rings 14 which insure a fluid-tight contact between the ovoid and the inner surface of the tube 7.

The ovoid 13 may be kept in position only by the fact that a pressure sufficient to resist the drawing action of the tube 7 is maintained downstream of the ovoid, for example at the point 15 of the tube 7.

In an alternative arrangement, the position of the ovoid may be maintained by providing permanent magnets 16 around the periphery of the ovoid 13, which magnets cooperate with pole pieces or electromagnetic members outside the tubular member 6 to keep the ovoid 13 in position. It will be seen that, due to the simple arrangement which has just been described, it is possible to form the tubular member 6 about a tube of synthetic material 7 having the same diameter.

Figure 3:
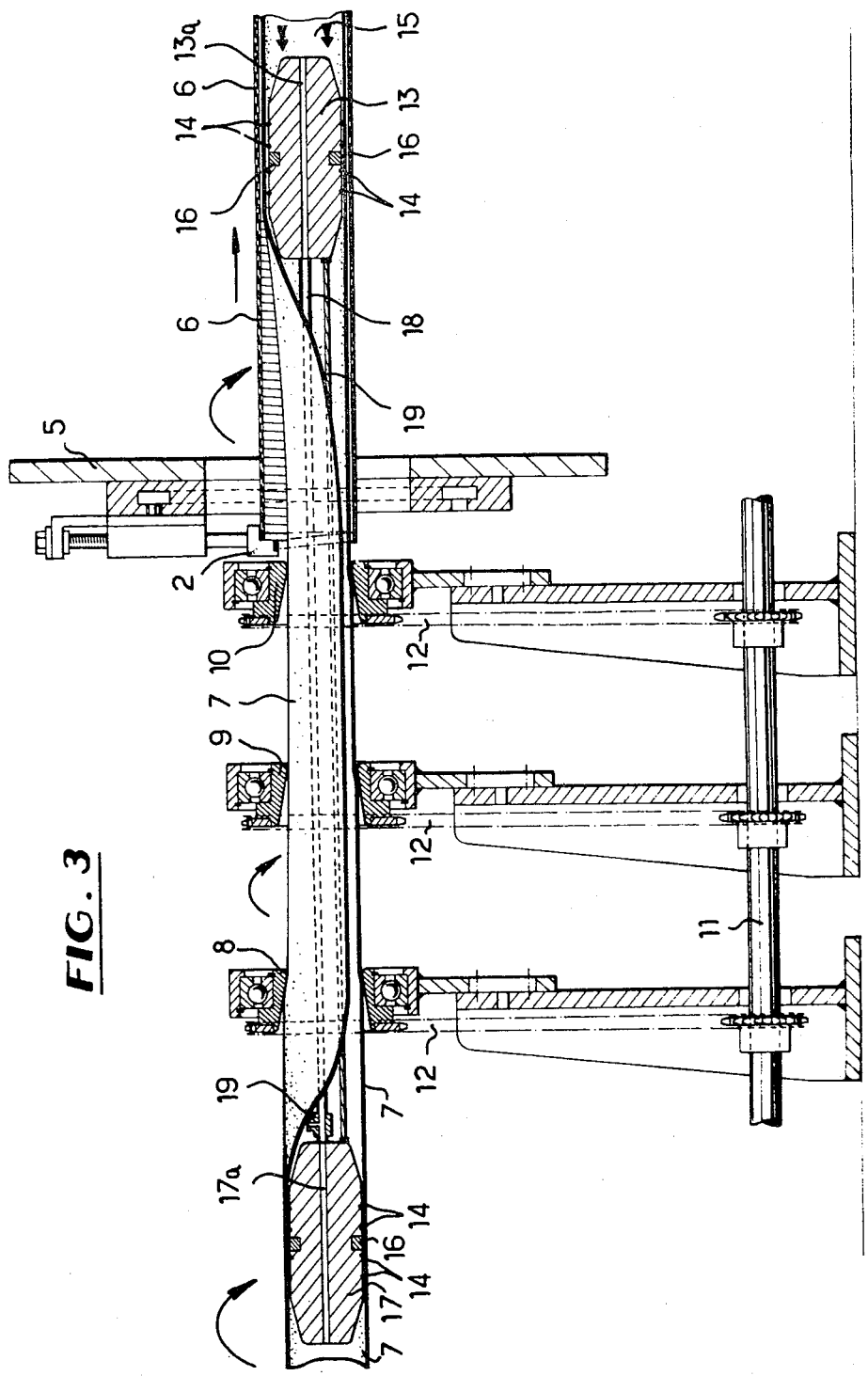
FIGS. 3 and 4 are axial sectional views of a modified device for use in carrying out the second and third methods of practicing the invention.

FIG. 3 shows a variation in which the tube of synthetic material is advanced from the left in a cylindrical form while being maintained under pressure by a pressurized fluid, such as air.

FIG. 3 shows all the components which have been described with reference to FIGS. 1 and 2 but, in this case, the device also comprises a second ovoid 17 which is mounted upstream of the ring 8 and which is also provided with permanent magnet 16 cooperating with pole pieces (not shown), and a sealing ring 14. Moreover the ovoid 13 has a central orifice 13a whereas the ovoid 17 has a central orifice 17a. These two orifices are in communication through a duct 18 which is equipped with a Venturi 19 making it possible to provide a partial vacuum in the zone between the ovoids 13 and 17.

In the embodiment illustrated, the two ovoids are also connected by a cable 19 which insures the rigidity of the connection between the olives 13 and 17, but it follows that the cable 19 may be eliminated when the duct 18 is made sufficiently strong.

In order to utilize the device of FIG. 3 it suffices to introduce air under pressure into one of the two ends of the tube 7, for example the end 15 in the case of FIG. 3, and provide for the release of air on the opposite side of the tube, so that there is a constant circulation of air at high speed in the duct 18 to produce by Venturi effect a partial vacuum inside the two tubes 7 between the two ovoids 13 and 17. This partial vacuum results in flattening of the tube, which then passes easily through the rings 8, 9 and 10 which have, as in the cases of FIGS. 1 and 2, diameters which decrease progressively.

By way of example, satisfactory results may be obtained by providing at point 15, that is to say downstream of the tube 7, a pressure of 4 atmospheres and adjusting the escape of air from the upstream end of the tube 7 so as to have a pressure there of about 2 atmospheres.

In this case as well, the assembly consisting of the ovoids 13 and 17, the tube 7 and the rings 8, 9 and 10 rotates at the same time as the tubular member 6 and at the same speed.

Figure 4:
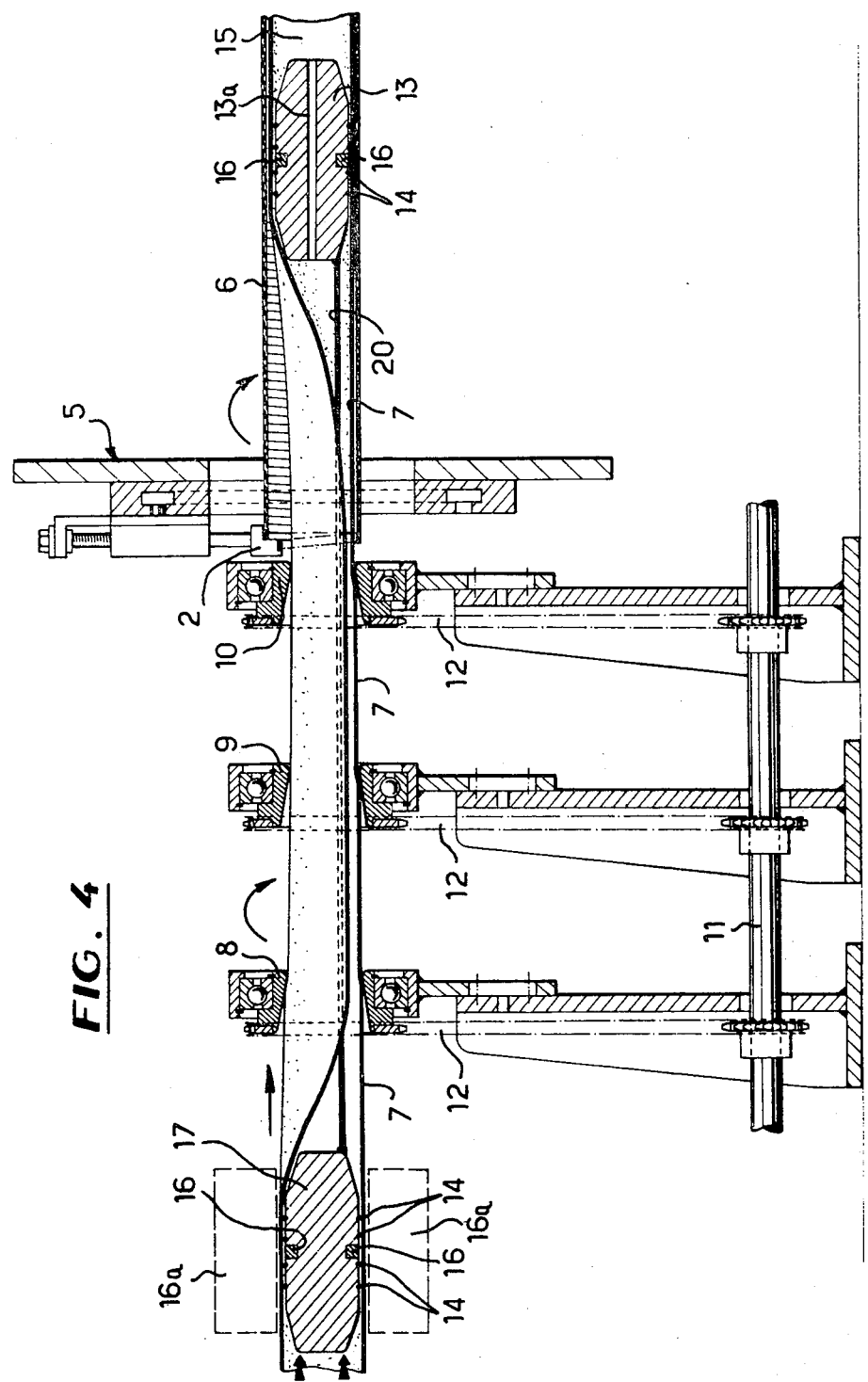

FIG. 4 shows a third method of carrying out the process according to the invention, the principal components of the device having already been shown on FIGS. 1, 2 and 3. In the case of the embodiment of FIG. 4 the ovoids 13 and 17 are connected by a rigid bar 20 and only the ovoid 13 is provided with an orifice 13a which passes all the way through it. The ovoid 17 is preferably provided with a sealing ring 14 and permanent magnet 16 which cooperate with magnetic member 16a situated outside the synthetic tube 7. In this case the magnetic members 16a have been schematically shown in broken lines, because they are indispensable to this embodiment of the process.

The tube of synthetic material 7 is fed from the left while being kept under slight pressure so that it remains in a cylindrical state and is folded on itself by passing through the rings 8, 9 and 10, which reduce it to an arcuate section to pass through the forming head 5.

The ovoid 13, which is attached to the ovoid 17 by the rod 20, returns the tube 7 to its cylindrical form.

In this embodiment of the invention, the orifice 13a in the ovoid 13 serves to keep the part of the tube 7 between the two ovoids at atmospheric pressure. The part of the tube 15 downstream of the ovoid 13 is also at atmospheric pressure, so as to evacuate downstream leakages of air through the ovoid 17.

It will of course be appreciated that the embodiments which have just been described have been given purely by way of example and may be modified as to detail without thereby departing from the basic principles of the invention. In particular, it is obvious that it is possible to carry out the invention using a different number of rings or with rings which are not rotated, with the tube 7 sliding while turning inside these stationary rings. Moreover, various components of the apparatus may be made in a different manner from those illustrated.

What is claimed is:

1. In a process for manufacturing a flexible tubular member by helically coiling a shaped metallic strip in a forming head about a cylindrical tube of synthetic material, the improvement according to which said process comprises the steps of bringing the tube of synthetic material into alignment with the tubular member being formed, at least partially flattening the tube of synthetic material, and passing it through at least one orifice having a curved periphery and a diameter less than the internal diameter of the tubular member being manufactured, whereby the tube of flattened synthetic material is shaped within said orifice to have an arcuate cross-section, passing said tube through the forming head, and restoring said tube of synthetic material to its initial cylindrical shape inside the tubular member which has been formed by passing it around an ovoid within said synthetic tube downstream of said forming head having an external diameter substantially equal to the inner diameter of said tube, while preventing axial movement of said ovoid in said tube by exerting fluid pressure against the downstream side of said ovoid.

2. In a process for manufacturing a flexible tubular member by helically coiling a shaped metallic strip in a forming head about a cylindrical tube of synthetic material, the improvement according to which said process comprises the steps of bringing the tube of synthetic material into alignment with the tubular member being formed, at least partially flattening the tube of synthetic material, and passing it through at least one orifice having a curved periphery and a diameter less than the internal diameter of the tubular member being manufactured, whereby the tube of flattened synthetic material is shaped within said orifice to have an arcuate cross-section, passing said tube through the forming head, and restoring said tube of synthetic material to its initial cylindrical shape inside the tubular member which has been formed by passing it around an ovoid within said synthetic tube downstream of said forming head, said ovoid having magnetic properties and an external diameter substantially equal to the inner diameter of said tube, while preventing movement of said ovoid axially of said tube by subjecting it to a magnetic field.

3. In a process for manufacturing a flexible tubular member by helically coiling a shaped metallic strip in a forming head about a cylindrical tube of synthetic material, the improvement according to which said process comprises the steps of bringing the tube of synthetic material into alignment with the tubular member being formed, by passing said tube of synthetic material over a first ovoid having a diameter substantially equal to the diameter of said tube, at least partially flattening the tube of synthetic material, and passing it through at least one orifice having a curved periphery and a diameter less than the internal diameter of the tubular member being manufactured, whereby the tube of flattened synthetic material is shaped within said orifice to have an arcuate cross-section, passing said tube through the forming head, and restoring said tube of synthetic material to its initial cylindrical shape inside the tubular member which has been formed by passing it around a second ovoid within said synthetic tube positioned downstream of said forming head and having an external diameter substantially equal to the inner diameter of said tube, said second ovoid being connected to said first ovoid by a duct provided with a Venturi opening into said tube between said ovoids, and said tube being flattened by passing a fluid through said duct to cause said Venturi to reduce the pressure in said tube.

4. Process as claimed in claim 3 which comprises the step of utilizing a magnetic field to hold at least one of said ovoids in position.

5. In a process for manufacturing a flexible tubular member by helically coiling a shaped metallic strip in a forming head about a cylindrical tube of synthetic material, the improvement according to which said process comprises the steps of bringing the tube of synthetic material into alignment with the tubular member being formed, by passing said tube of synthetic material over a first ovoid having a diameter substantially equal to the diameter of said tube, at least partially flattening the tube of synthetic material, and passing it through at least one orifice having a curved periphery and a diameter less than the internal diameter of the tubular member being manufactured, whereby the tube of flattened synthetic material is shaped within said orifice to have an arcuate cross-section, passing said tube through the forming head, and restoring said tube of synthetic material to its initial cylindrical shape inside the tubular member which has been formed by passing it around a second ovoid within said synthetic tube positioned downstream of said forming head and having an external diameter substantially equal to the inner diameter of said tube, said second ovoid being pierced by an opening which permits the pressure downstream of said second ovoid to be equalized with the pressure between said ovoids, keeping said ovoids spaced by means of a mechanical connection therebetween, utilizing a magnetic field to prevent at least one of said ovoids from moving axially of said tube, and applying fluid pressure inside said tube upstream of said first ovoid.

6. Apparatus for manufacturing a flexible tubular member by helically coiling a shaped metallic strip in a forming head about a tube of synthetic material, said apparatus comprising in combination: means for advancing a tube of synthetic material through said forming head along the axis of the tubular member being formed, means defining at least one orifice in the path of travel of said tube upstream of said forming head having a diameter less than the inner diameter of the tubular member being formed, at least one ovoid having an outer diameter substantially equal to the inner diameter of the synthetic tube, and means for holding said ovoid in a position inside said tube downstream of the forming head.

7. Apparatus as claimed in claim 6 which comprises magnetic means for maintaining the ovoid in position.

8. Apparatus as claimed in claim 6 comprising a second ovoid upstream of the orifice, said two ovoids being connected by a duct which connects the spaces upstream and downstream of the two ovoids and comprising a Venturi between the two ovoids which makes it possible to create a partial vacuum between said ovoids by passing a fluid through said duct.

9. Apparatus as claimed in claim 6 which comprises a second ovoid positioned upstream of said orifice, said two ovoids being connected to each other, the upstream ovoid being in substantially sealing contact with the upstream part of the tube, and magnetic means holding said upstream ovoid in place, said downstream ovoid being pierced by an opening which permits the same pressure to prevail on both sides of said downstream ovoid.

* * * * *

UNITED STATES PATENT OFFICE
CERTIFICATE OF CORRECTION

Patent No. 3,686,744      Dated August 29, 1972

Inventor(s) RENE A. MAZUIR and DANIEL HOFFMANN

It is certified that error appears in the above-identified patent and that said Letters Patent are hereby corrected as shown below:

[73] Assignee: Societe Anonyme Des Hauts
                 Fourneaux De La Chiers
                 Longwy-Bas, France Signed and sealed this 13th day of March 1973.

(SEAL)
Attest:

EDWARD M. FLETCHER, JR.          ROBERT GOTTSCHALK
Attesting Officer                 Commissioner of Patents